United States Patent Office 3,318,068
Patented May 9, 1967

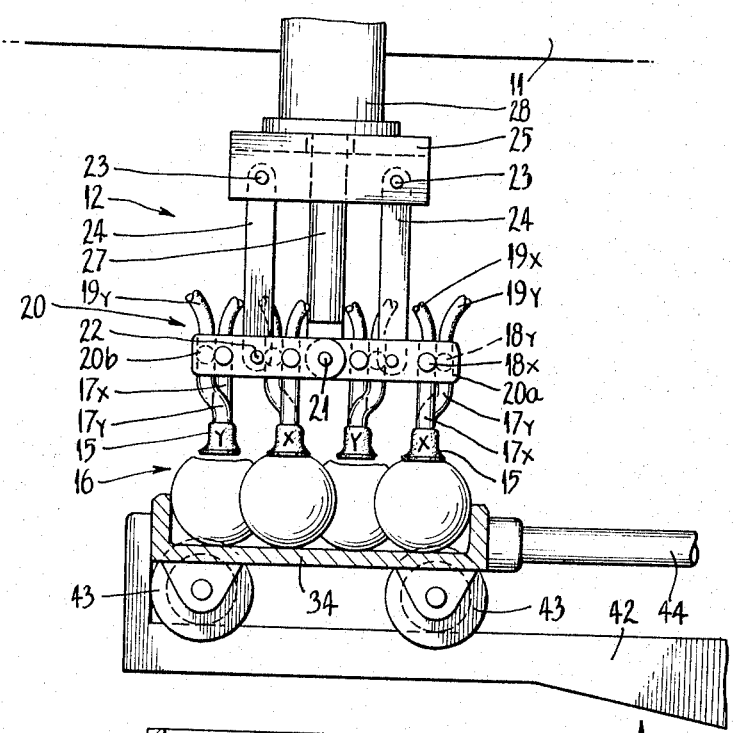
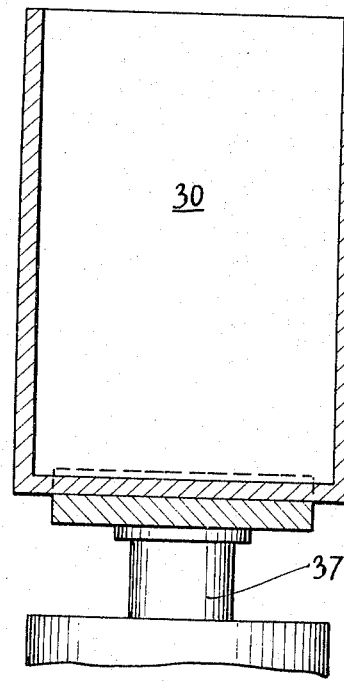
FIG. 4.

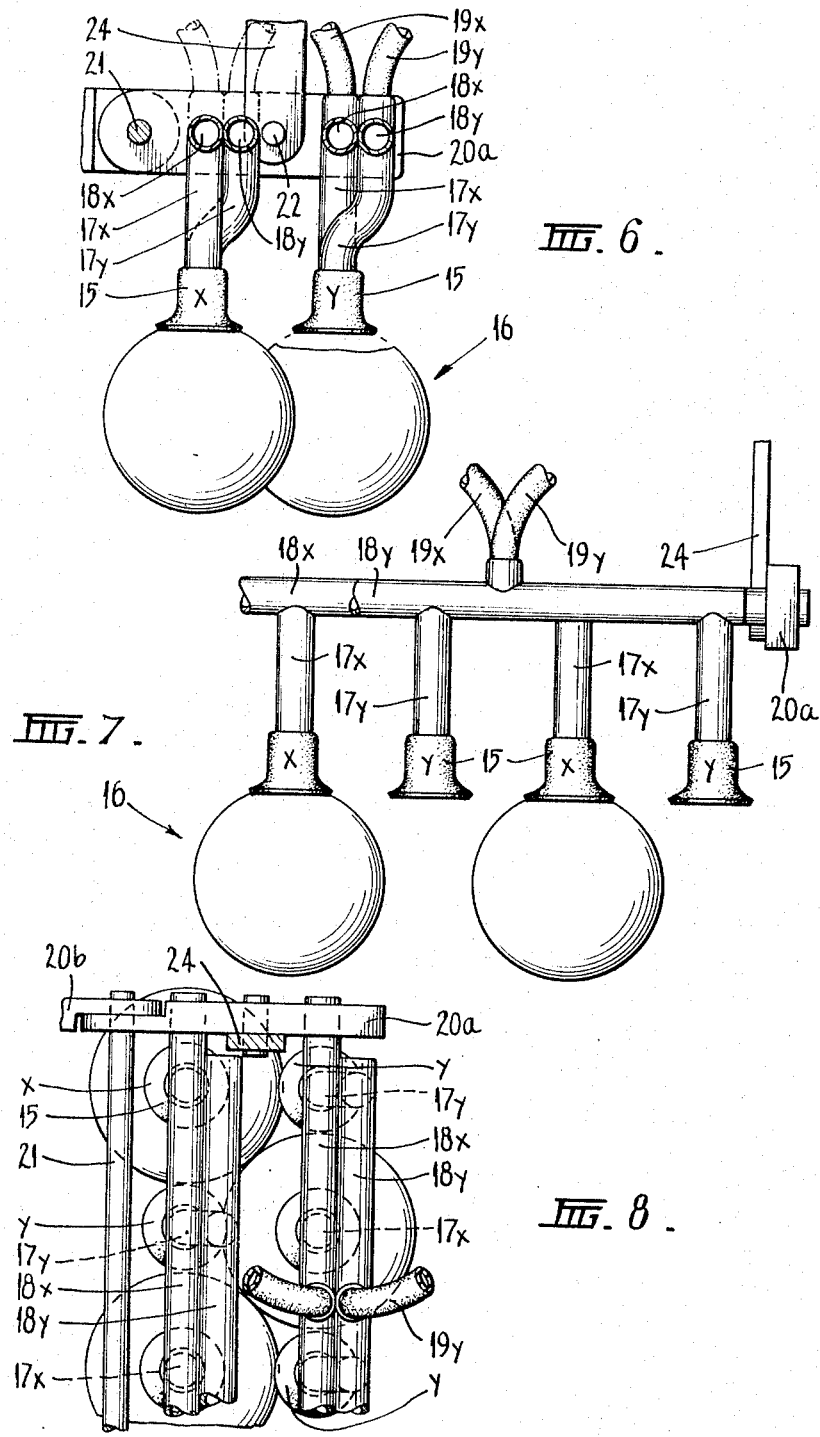

3,318,068
PACKING OF FRUIT
Izak Johannes Vouillaire, P.O. Box 543,
Mildura, Victoria, Australia
Filed July 24, 1964, Ser. No. 384,986
Claims priority, application Australia, July 26, 1963,
33,478/63
6 Claims. (Cl. 53—164)

This invention relates to the packing of fruit and more particularly is directed to an improvement in or modification of the invention forming the subject matter of my prior U.S. patent application Ser. No. 204,738, now Patent No. 3,168,204, issued Feb. 2, 1965, which describes and claims apparatus for mechanically packing fruit in cases as claimed in the specification of my U.S. Patent No. 2,938,315, wherein the means to, firstly, engage the formed layer of fruit with the fruit in predetermined row formation so as to maintain it intact, secondly, transfer the layer to a release position disposed relative to the fruit case, and thirdly, release the fruit whereby the latter will assume within the fruit case the said row formation, comprises a plurality of suction cups operatively connected to a source of vacuum or sub-atmospheric pressure so arranged and controlled that each article of fruit is simultaneously vacuum attached to an individual suction cup and retained thereby in substantially the predetermined row formation of the said layer until required to be released.

As explained in Patent No. 3,168,204, it is the practice in packing fruit that each layer be made up of a number of rows containing a given number of pieces of fruit, successive rows being staggered relative to one another by an amount approximately equal to half the diameter of the fruit. The practice also requires that the rows of fruit in one layer are staggered by a similar amount in relation to the row immediately below it. Thus, alternate layers are not quite identical but are complementary to one another, the voids between the pieces of fruit in one layer being occupied by the pieces of fruit in the next layer, and so on.

It is the principal objective of the instant invention to provide an improved means for picking up and delivering to the fruit case articles of fruit in the predetermined row patterns, having the desirable characteristic of simplifying the construction of the apparatus whilst accelerating the delivery of the layers of fruit with resultant increased output of packed and boxed fruit by the apparatus.

With that objective in view, there is provided according to the present invention apparatus for mechanically packing fruit in cases as set forth in Patent No. 3,168,204, characterised in that a single suction head has the rows of suction cups arranged and disposed to provide two sets of suction cups, each set separately coupled to the source of vacuum or sub-atmospheric pressure and alternately operable, each set providing the predetermined row formation for alternate layers.

Thus, instead of a pair of similar pick-up heads, alternate layers of fruit, upon being picked up by the cups of a single suction head one layer at a time off the conveyor means, are arranged in the two predetermined row formations, which are co-ordinated with the movement of the fruit case and selective control of the suction to the suction cups so as to be released one layer at a time for delivery in that form into the case.

In this arrangement there is only one station, the pick-up head (which includes the suction head) and the vertically reciprocatable fruit case being positioned at that station. Between the pick-up head and the fruit case, when the latter is lowered, the conveyor means carrying a preformed layer of fruit is interposed, after which the layer is picked up by the suction head, as described in Patent No. 3,168,204, and the conveyor means subsequently withdrawn to receive another layer of fruit in predetermined row formation. Thereafter, the fruit case is raised to the required level to receive the layer from the pick-up head.

A practical arrangement of the invention will now be described with reference to the accompanying drawings in which:

FIG. 4 is a view similar to FIG. 3 but with the conveyor means raised and the pieces of fruit of the layer contacting and vacuum attached to the respective suction cups.

FIG. 6 is a detail, drawn to an enlarged scale, showing the arrangement of pipes and flexible tubes connecting the respective sets of suction cups to the source of vacuum.

FIGS. 7 and 8 are front elevation and plan views respectively of FIG. 6.

Figure 1:
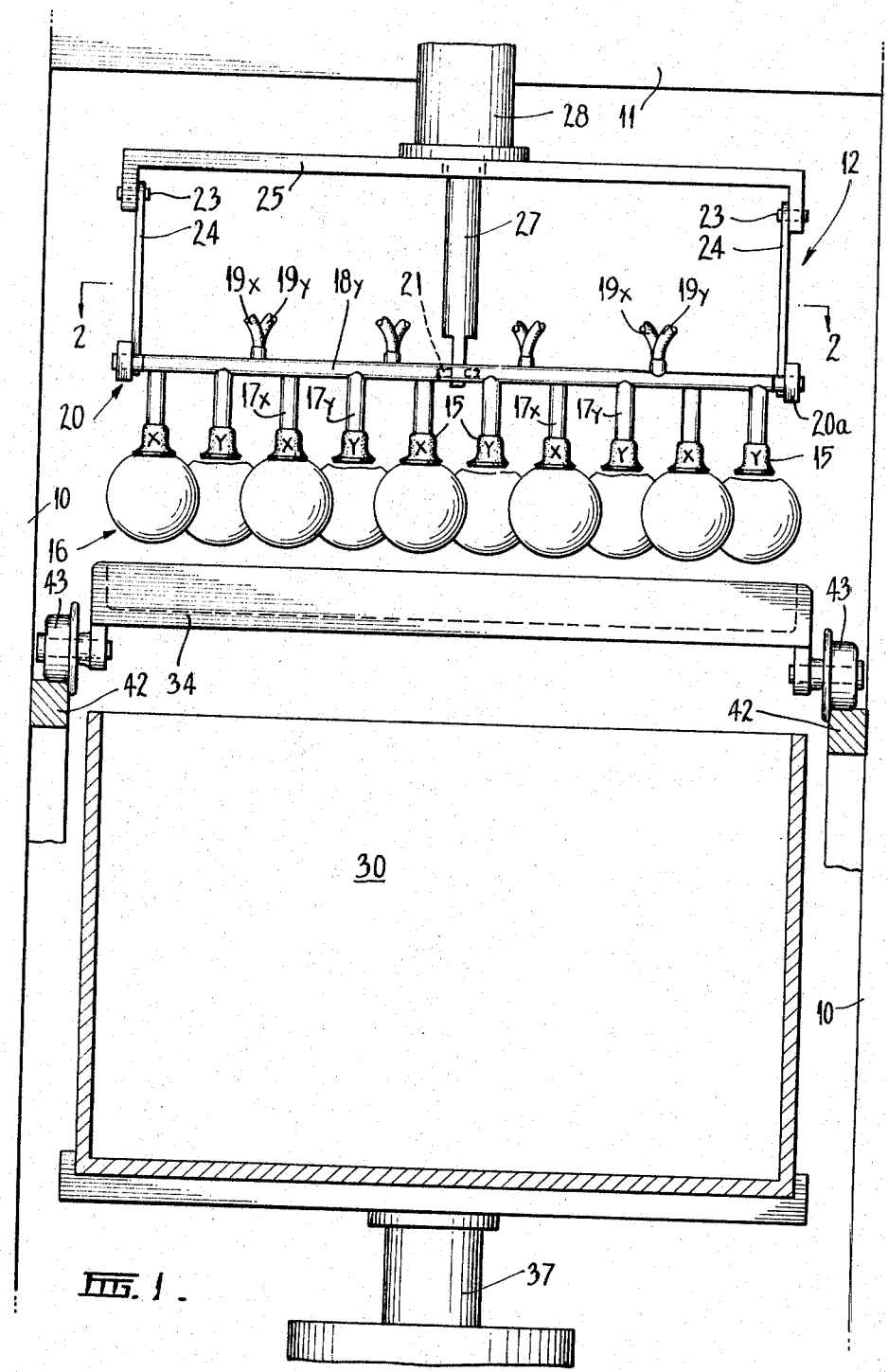
FIG. 1 is a front elevation of a portion of a fruit packing machine embodying a suction head according to the invention, with a preformed layer of fruit shown vacuum attached to one set of suction cups.
Figure 2:
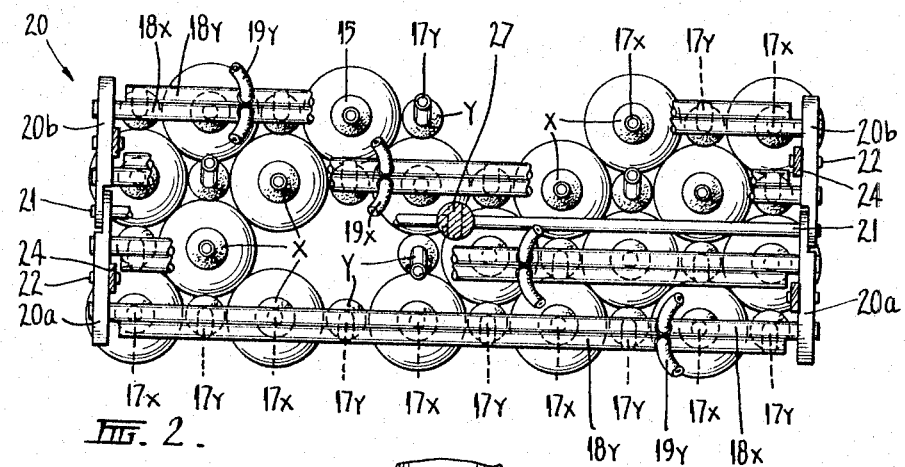
FIG. 2 is a sectional plan of the suction head taken on the line 2—2 of FIG. 1, and partly broken away to assist in clarity.

Referring to the drawings, the main frame 10 of the fruit packing machine has a transverse beam 11 which stationarily supports a pick-up head 12, mounted in correlated relationship with conveyor means, including a horizontally reciprocatory tray 34, and a vertically reciprocatory fruit case 30.

The pick-up head comprises a plurality of suction cups 15, the number and disposition of those cups marked X corresponding to the particular layer formation 16 illustrated, whilst the cups marked Y correspond to the alternate layer formation (not shown).

The suction cups 15, which are identical and are made of rubber or like resilient material, are each attached to the lower end of a rigid pipe 17 forming a downwardly directed branch of one of a series of horizontal air-tight pipe lines 18, connected to a source of vacuum by flexible tubes 19.

The pipe lines 18 are arranged in duplicate, preferably rigidly attached together as a series of pairs of parallel pipe lines 18X–18Y, the suction cups marked X being connected to the 18X pipe lines and the suction cups marked Y being connected to the pipes lines designated 18Y. Similarly the rigid pipes 17 and the flexible tubes 19, are designated 17X, 17Y and 19X, 19Y, according to the sets of cups X and Y, respectively, to which they relate. (See FIGS. 6 to 8.)

The pipe lines 18 are rotatably supported in a frame 20, centrally hinged at 21 to constitute two sub-frames 20a and 20b, each of which sub-frames is pivotally mounted for rocking about a horizontal axis 22 parallel to the axis of the said central hinge 21.

The rocking axes 22 of the sub-frames are supported in depending links 24, pivotally mounted at 23 upon the backplate 25 of the pick-up head 12.

Figure 5:
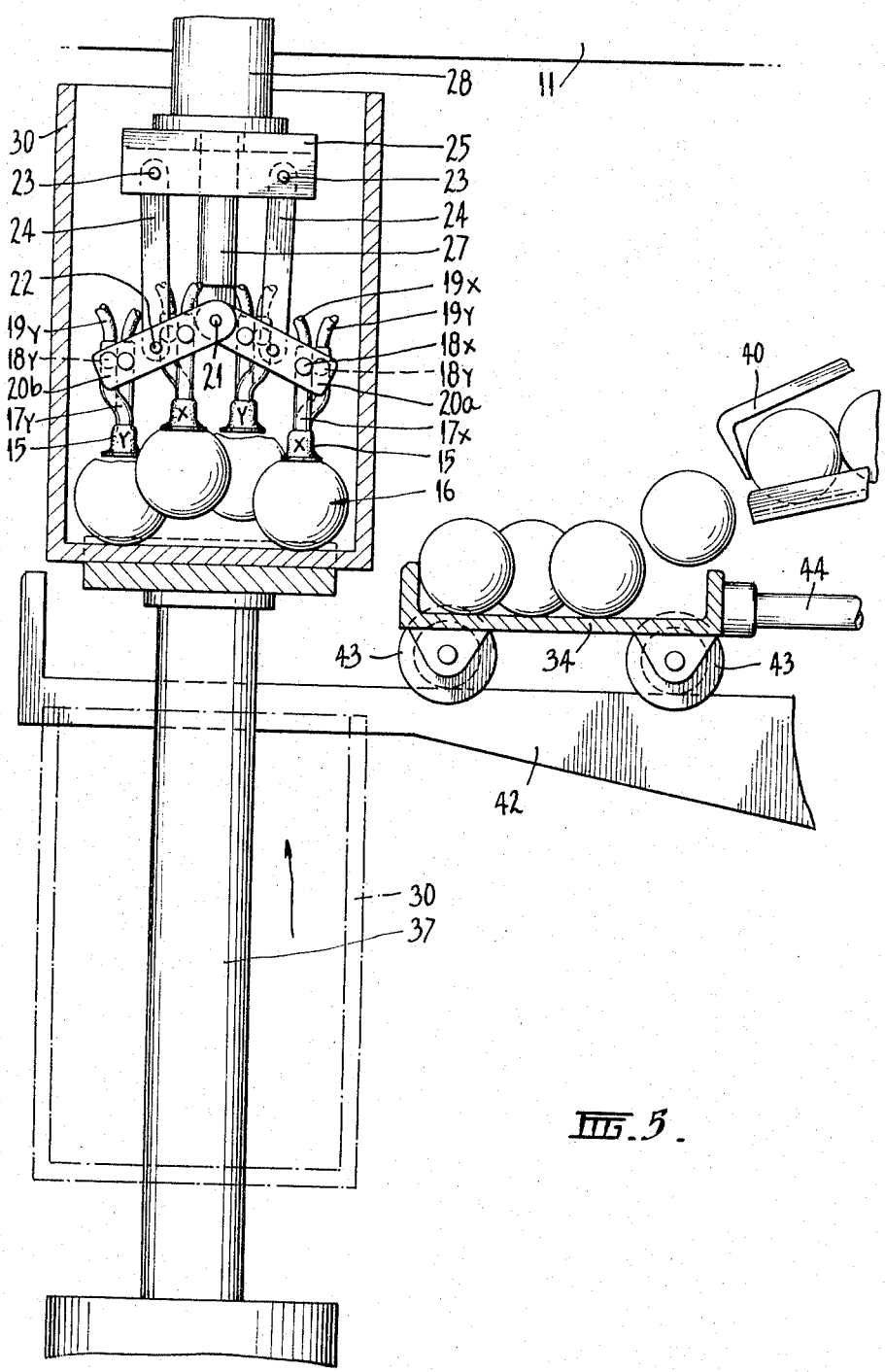
FIG. 5 is a side elevation of the pick-up head showing the conveyor means withdrawn to the loading position, the suction head arched, and the fruit case (shown in section) fully raised to receive a first layer of fruit.

The central hinge 21 is connected by piston rod 27 to a power actuated cylinder 28, which may be either hydraulically or pneumatically operated, whereby the sub-frames 20a, 20b, can be disposed at an obtuse angle to one another and so produce an arching of the frame 20 responsive to the said power actuation, as shown in FIG. 5. It will be seen that this arching of the frame 20 appreciably reduces the overall width of the original layer of fruit 16 so that it can be readily inserted into the fruit case 30.

The set of suction cups X is connected to a source of vacuum by way of pipes 17X, pipe lines 18X, and flexible tubes 19X, whilst the set of suction cups Y is connected to the same or a separate source of vacuum by way of pipes 17Y, pipe lines 18Y, and flexible tubes 19Y, control means controlling the supply and cutoff of vacuum to each set independently as required.

The tray 34 of the conveyor means is horizontally reciprocatory between a position beneath the pick-up head and a loading position in which latter position it is charged with pieces of fruit in predetermined row formation. The conveyor means also comprises members 42 which are vertically reciprocatory in unison and support the tray 34 for horizontal movement between the above defined positions. Preferably, the tray 34 has rollers 43 which roll upon the members 42, and there is power operating means, such as a pneumatic or hydraulically actuated piston and rod, indicated at 44, for controlled movement of the tray 34.

Figure 3:
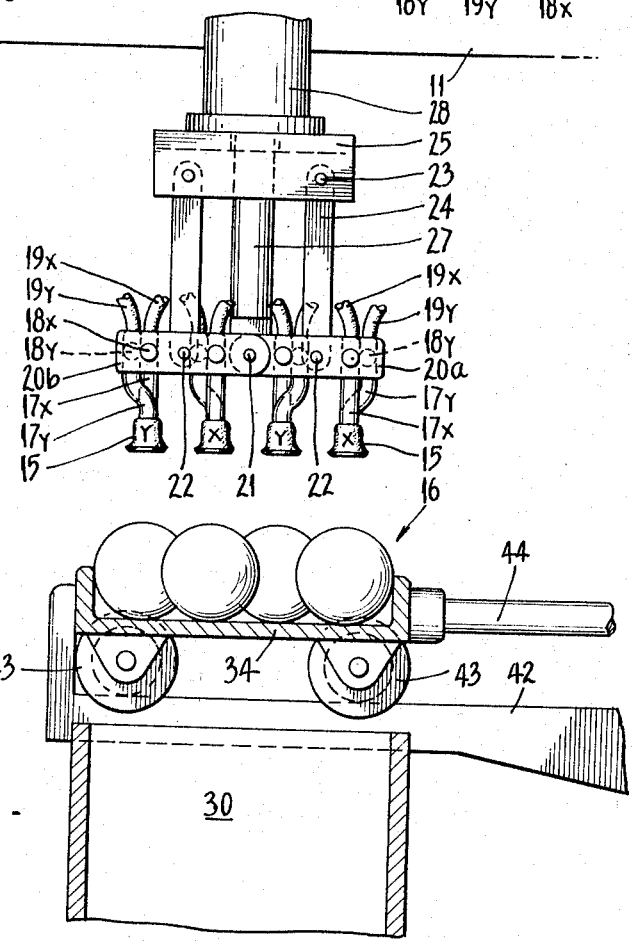
FIG. 3 is a side elevation of the pick-up head showing a preformed layer of fruit on the conveyor means prior to being raised into pressure contact with a set of suction cups.

In operation, a layer of fruit arranged in predetermined row formation as hereinbefore described, is delivered by means indicated at 40 to the tray 34 of the conveyor means whilst the latter is withdrawn in a horizontal plane from under the pick-up head 12, as shown in FIG. 5. The tray 34 is then advanced until it is immediately beneath the pick-up head and the pieces of fruit in the layer register with a set of suction cups 15 as shown in FIG. 3. As previously mentioned, the number and disposition of the cups 15X correspond to the layer formation 16, illustrated, so that in this instance the layer will register with the X set of cups.

The members 42 of the conveyor means are then raised, for example, by pneumatic or hydraulic power actuated means (not shown), to bring each of the articles of fruit of the layer 16 in the tray 34 into pressure contact with a cup 15X (FIG. 4) when a reduced pressure (referred to hereinafter as "vacuum") is applied to these cups through the flexible tubes 19X, pipe lines 18X and pipes 17X, whereby the layer of fruit is retained in the pick-up head. The members 42 with the tray 34 of the conveyor means are then lowered to resume their normal loading level and the tray 34 is withdrawn to the loading position to receive another layer of fruit, this time in predetermined complementary Y row formation.

Immediately after the tray 34 is withdrawn from under the pick-up head and whilst the latter operation of reloading is taking place, the frame 20 of the pick-up head 12 is arched by actuation of the cylinder 28 and piston rod 27, and consequently the layer of fruit is arched in readiness for insertion into the fruit case 30, which is below and in register with the pick-up head. The fruit case 30 is then raised until the layer of fruit is at the required level within the case, when the layer is released by breaking the vacuum in the suction cups 15, and the case 30 is then lowered to its normal position.

Raising and lowering of the fruit case 30 can be effected by any suitable known means such as a pneumatic or hydraulic power actuated means, indicated at 37.

The returning of the arched frame 20 to its horizontal plane may occur either partly or wholly before releasing the layer of fruit in the fruit case, or it may be delayed until a later stage, it being understood that, once a layer is released, the articles of fruit will automatically take up their position in required row formation in a substantially horizontal plane within the boundaries imposed by the sides of the case. Some individual adjustments will always take place since the articles of fruit are not entirely uniform in their spherical proportions; this adjustment is automatic and the disparities between the size and shape of indiivdual articles of fruit is found to cancel out for practical purposes when a few layers have been packed.

To enable the frame 20 with a layer of fruit intact to be readily inserted into a fruit case with respect to its longitudinal dimension, not only is the frame 20 made appreciably shorter than the inside length of the case but the preformed layer of fruit is also proportioned so that its overall length provides ample clearance in that direction. To compensate for this, the width of the layer at the pick-up stage is appreciably greater than the inside width of the case.

The arching of the layer reduces its width to well within that of the fruit case so that during insertion the necessary clearance in all directions is provided. As explained above, the layer of fruit, upon release, finally takes up its correct position in the fruit case automatically.

It will be appreciated by those conversant with the art that the number of articles of fruit in a row and/or the number of rows in a layer will vary according to the size of the fruit being packed, it being understood that the fruit is previously graded.

In the instant specification, the example considered is a layer composed of 4 longitudinal rows of 5 pieces of fruit per row. As already explained, the pieces of fruit in each alternate complementary layer occupy the voids between the pieces of fruit of the preceding and subsequent layers. This is initiated by the feeding device 40 which is so adapted and controlled that it lays alternate X and Y layers onto the tray 34. When an X layer is presented to the pick-up head, the vacuum system is controlled to operate the X suction cups only whereas, when a Y layer is presented, the Y suction cups only are operative.

For smaller pieces of fruit, there may be 4 rows alternating 5 and 6 pieces, as described and illustrated in my U.S. patent specification No. 2,938,315. Other combinations of numbers of rows and pieces may, of course, be employed according to requirements.

To meet such variations in layer combinations, interchangeable pickup heads 12 are provided, the number and disposition of the pipe-lines 18 and pipes 17 being arranged accordingly to position the suction cups 15 in register with the pieces of fruit in the particular layers. In other respects, the pick-up heads would be the same as above described.

Obviously, the actuating mechanisms could be varied from the pneumatic or hydraulic systems indicated, e.g. they could be electrical solenoid operated. Again, relative movement of the pick-up head and the conveyor means and/or the fruit case could be achieved by reciprocating the pick-up head. Likewise the arrangement for arching the layer of fruit could be varied without departing from the broad concept of the invention as defined in the claims which follow.

I claim:
1. A suction operated pick-up head for picking up articles comprising a first combination of suction cups to pick up a first layer of articles and place them in a container, the diameter of said cups being less than half the diameter of each of the articles to be placed, a second combination of suction cups in staggered relation located in the spaces between and adjacent said first named cups, said second combination being complementary to said first combination to pick up a second layer of articles and place them in the container superimposed upon said first layer of articles, a separate vacuum duct system for each of said first and second combinations of cups for operating their suction cups, and control means alternately connecting each said separate vacuum duct system to a vacuum source.

2. An apparatus for mechanically packing fruit in cases wherein the pieces of fruit are arranged in predetermined layer formation each layer being made up of a number of rows each row containing a given number of pieces of fruit and having alternate rows staggered relative to one another by an amount approximately equal to half the diameter of the fruit, and having the rows of fruit in one layer staggered by a similar amount in relation to the row immediately below it; the combination comprising a suction operated pick-up device for picking up said layers, one layer at a time, said pick-up device comprising a single suction head having rows of suction cups arranged and disposed so as to provide two sets of suction cups, each set separately coupled to a source of vacuum and alternately operable, and each set corresponding to said predetermined row formation for alternate layers.

3. Apparatus according to claim 2, wherein horizontal pipe lines are provided supporting the suction cups, said pape lines being arranged in parallel pairs attached together, the cups of one set of suction cups being connected to one of said pipe lines and the cups of the other set being connected to the other of said pipe lines, and control means controlling the application and cut-off of vacuum to each set of cups independently.

4. Apparatus according to claim 3, wherein said pick-up device is located at a stationary pick-up position to which position conveyor means in alternate row formations corresponding first to the disposition of one set of suction cups and in register therewith, and next to the disposition of the other set of suction cups and in register therewith periodically presenting to said pick-up position a performed layer of fruit, each layer in turn being picked up by said suction head and deposited into a case presented to the pick-up device during intervals between the presentations of the layers by said conveyor means.

5. Apparatus according to claim 4, wherein means are provided to intermittently produce relative movement of said conveyor means and said pick-up device so that each layer of fruit when in register with the respective set of suction cups is brought into pressure contact with such suction cups by which said layer is retained.

6. Apparatus according to claim 4, wherein means are provided to intermittently produce relative movement of said pick-up device and the fruit case so that each layer of fruit retained by the suction cups is inserted into the fruit case and deposited therein upon release of the vacuum in the suction cups.

References Cited by the Examiner
UNITED STATES PATENTS

| | | | |
|---|---|---|---|
| 2,524,846 | 10/1950 | Socke et al. | 53—247 X |
| 3,168,204 | 2/1965 | Voullaire | 53—247 X |

TRAVIS S. McGEHEE, *Primary Examiner.*

FRANK E. BAILEY, *Examiner.*

P. H. POHL, *Assistant Examiner.*